(12) United States Patent
Nothen et al.

(10) Patent No.: US 8,778,180 B2
(45) Date of Patent: Jul. 15, 2014

(54) WATER FILTER SUPPORT

(75) Inventors: Luciano Piccini Nothen, Joinville (BR);
Flavio Silvio Gava, Joinville (BR);
Ledimara Mascarello, Joinville (BR);
Sandro Augusto Trippia, Joinville (BR);
Patricia Daiane Tambosi, Joinville (BR)

(73) Assignee: Whirlpool Corporation, Benton Harbor, MI (US)

( * ) Notice: Subject to any disclaimer, the term of this patent is extended or adjusted under 35 U.S.C. 154(b) by 169 days.

(21) Appl. No.: 13/331,878

(22) Filed: Dec. 20, 2011

(65) Prior Publication Data
US 2012/0152815 A1   Jun. 21, 2012

(51) Int. Cl.
*B01D 27/08* (2006.01)
*B01D 35/20* (2006.01)
*F24C 15/00* (2006.01)
*F24C 1/04* (2006.01)
*A21B 3/00* (2006.01)
*A21B 1/36* (2006.01)
*B01D 35/30* (2006.01)

(52) U.S. Cl.
CPC .............. *B01D 27/08* (2013.01); *B01D 35/30* (2013.01); *F24C 15/00* (2013.01); *F24C 1/04* (2013.01); *A21B 3/00* (2013.01); *A21B 1/36* (2013.01)
USPC ........... 210/232; 210/249; 210/443; 126/369; 426/510; 426/511; 99/516

(58) Field of Classification Search
CPC .......... B01D 27/08; B01D 35/30; F24C 1/04; F24C 15/00; A21B 1/36; A21B 3/00
USPC ........... 210/232, 249, 443; 126/369; 426/510, 426/511; 99/516
See application file for complete search history.

(56) References Cited

U.S. PATENT DOCUMENTS

2007/0012611 A1 *   1/2007   An ................................. 210/232

FOREIGN PATENT DOCUMENTS

KR      10-0333617     *  6/2001

* cited by examiner

*Primary Examiner* — Thomas M Lithgow

(57) ABSTRACT

A device for supporting and fixing a water filter in connection with an oven having a chassis that includes: a housing for receiving the water filter that attaches to the bottom surface with a chassis of the oven; a protective plate that attached to the front wall of the housing; and a cover plate that hides the protective plate and the water filter to keep the set built-in.

3 Claims, 3 Drawing Sheets

WATER FILTER SUPPORT

CROSS REFERENCE TO RELATED APPLICATION

This application claims priority to Brazilian Application No. PI1005754-4, filed on Dec. 20, 2010, entitled DISPOSITIVO DE SUPORTE E FIXAÇÃO PARA FILTRO DE ÁGUA OU EQUIPAMENTOS SIMILARES, the disclosure of which is hereby incorporated by reference in its entirety.

BACKGROUND OF THE INVENTION

As is common knowledge, food preparation in ovens commonly causes dehydration; for this reason, the humidification of products is a fundamental procedure in order to have as final result, a food with appropriate characteristics of taste, smoothness and crispness—and consequently less dry.

The process of humidification can be done manually by the user or through the use of systems that supply water vapor. Gas ovens are known that provide steam injected through a water inlet. Such equipment, while moistening the food without requiring direct contact of the user with the heated environment, requires the existence of an independent water source close to the place of installation and the interconnection of such a source to the supply nozzle located at the bottom of the same, therefore, involving a complex installation and unpleasant visual appearance.

BRIEF SUMMARY OF THE INVENTION

An aspect of the present invention includes a device for supporting and fixing a water filter in ovens. The device typically includes a housing that attaches to or otherwise engages the bottom surface of the chassis of the oven; a protective plate that attaches to or otherwise engages the front wall of the housing, and a cover plate that hides the protective plate and the filter to keep the set built-in.

In another aspect of the present invention, the housing is attached or otherwise engaged to the bottom surface of the chassis through a top perimeter flap, provided that such housing accommodates the filter and at least one connector to the water pipelines. The housing further typically includes a hole in its anterior surface to accommodate and guide the positioning of the filter. The housing also has the capacity to store an amount of fluid that may leak during the removal of the filter. Also, a protective plate is typically provided with a hole coincident with the hole in the housing to accommodate and guide the positioning of the filter.

These and other features, advantages, and objects of the present invention will be further understood and appreciated by those skilled in the art by reference to the following specification, claims, and appended drawings.

DETAILED DESCRIPTION

The present invention relates to a device for supporting and fixing water filters, in particular, water filters used in connection with ovens or similar equipment. The water filters used in ovens or similar equipment moisten foods during cooking. The device for supporting and fixing water filters is designed to provide greater convenience, comfort and safety for users, and present a simple building process that is also economically viable.

The present invention will hereinafter be fully described based on the examples of implementation represented in the attached drawings.

Figure 1:
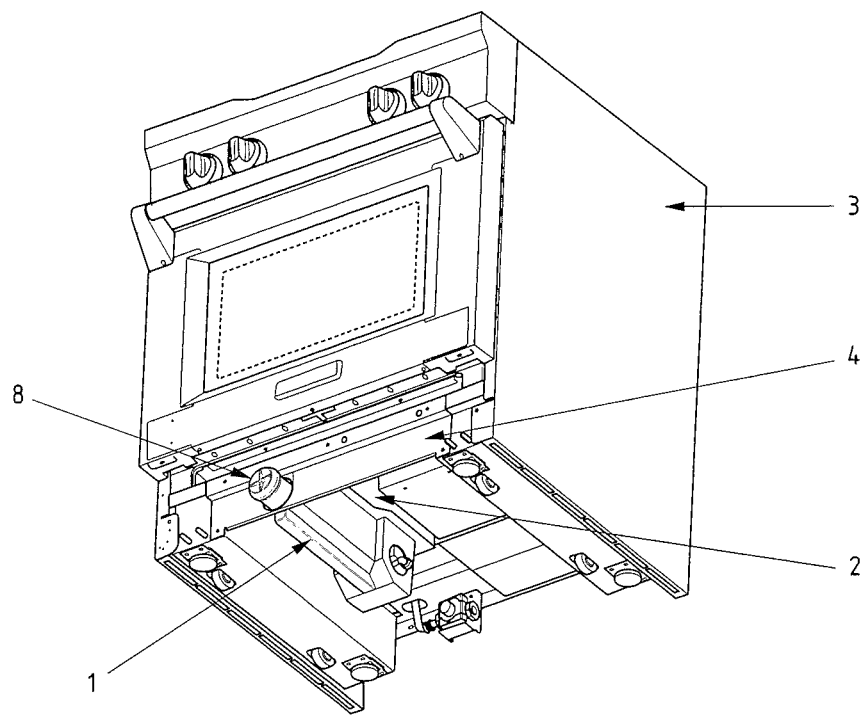
FIG. 1 shows a bottom perspective view of a preferred embodiment of an equipment comprising a device for supporting and fixing the filters of the present invention, without the external cover plate.
Figure 2:
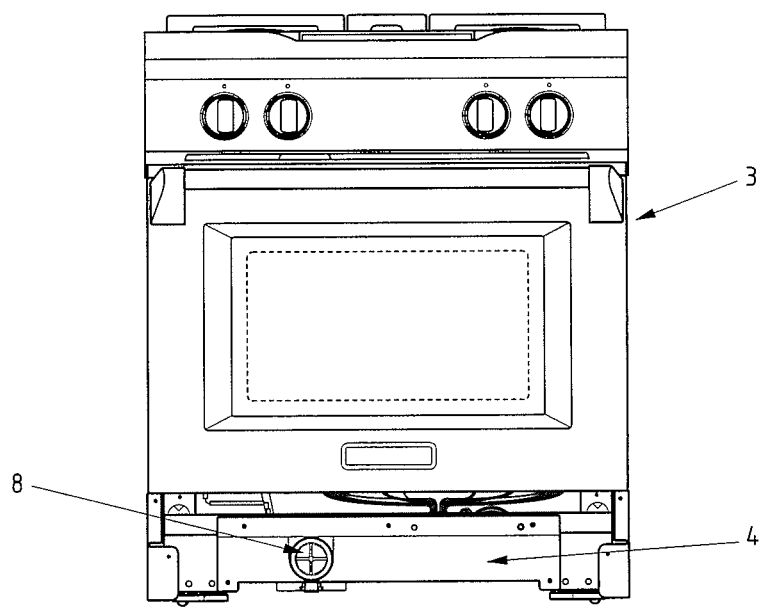
FIG. 2 shows an elevation view of the embodiment shown in FIG. 1.
Figure 3:
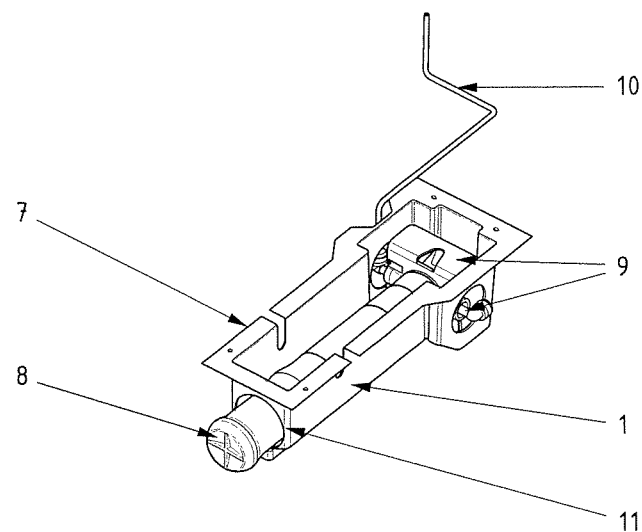
FIG. 3 shows a perspective view of the housing built according to a preferred embodiment form of the invention, including the filter, connectors and water pipelines.
Figure 4:
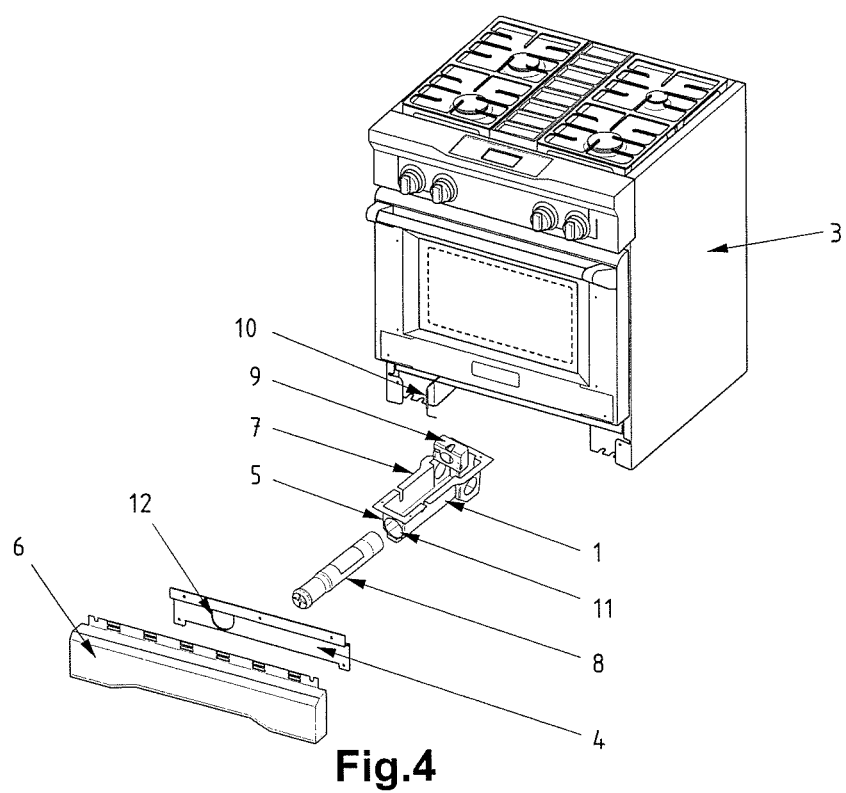
FIG. 4 shows an exploded view of the preferred embodiment of the present invention.

FIGS. 1, 2 and 3 illustrate an equipment, typically a piece of cooking/heating equipment. In this case, a stove or oven. The device for supporting and fixing the water filter is typically installed in or used in connection with the stove or oven. As can be seen in the figures, the device typically includes a housing (1) that attaches to or otherwise engages with a bottom surface (2) of the chassis (3) of the equipment, most typically with the aid of screws or other suitable fasteners; a protective plate (4) that attaches to the front wall (5) of the housing (1), and a cover plate (6) that hides the protective plate (4) and the filter (8) to keep the set built-in.

As can be seen in more detail in the FIG. 3, the housing (1) is typically provided with a container top perimeter flap (7) in which, typically with the aid of screws or similar fasteners, attaches on or otherwise engages with the bottom surface of the chassis (3) of the stove, oven or similar equipment. This form of construction allows the housing (1) to accommodate inside a given volume of water that may fall from the filter (8) during the removal procedure for maintenance, replenishment or replacement, as well as being capable of storing any condensed liquid. Moreover, the housing (1) accommodates the filter (8), the connectors (9) and the water pipelines (10).

The temperature at the bottom surface of the chassis (3) of the equipment during its use remains low, so that the housing (1) and protective plate (4) can be made of plastic or similar material, which reduces the cost of manufacturing the device.

According to one aspect of the present invention, the housing (1) is provided with a hole (11) in its anterior surface, in a position coincident with an existing hole (12) in the protective plate (4), which consists of the guide for the correct placement and accommodation of the positioning of the filter (8).

Figure 5:
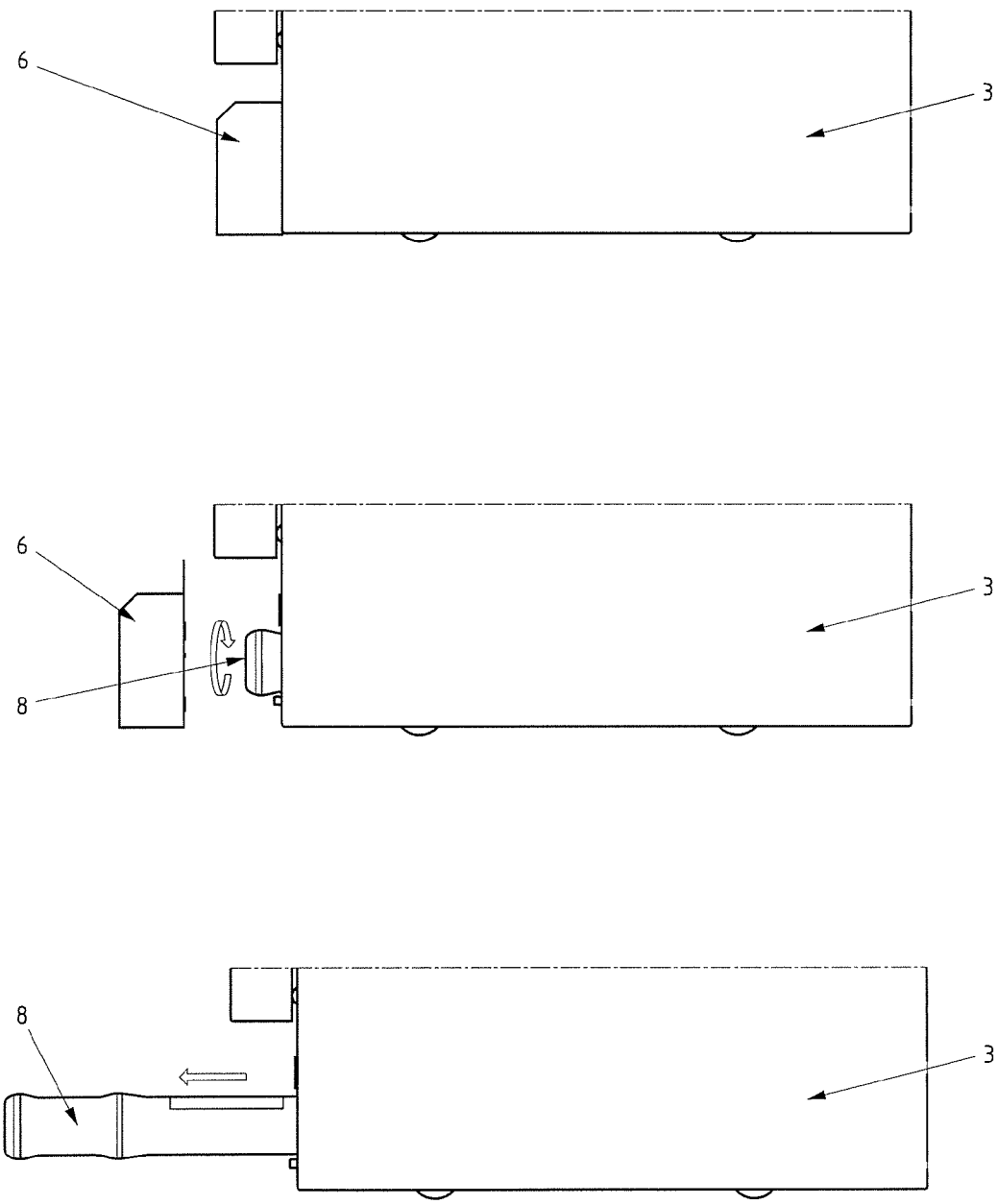
FIG. 5 illustrates, in side elevation, the sequence of procedures that are performed to remove the filter for maintenance and/or replacement.

The procedures to be performed to remove the filter are illustrated in FIG. 5. The user removes the cover place (6), and rotates the filter (8) to remove it. For replacement, insert the filter (8) again by guide holes (11) and (12), and rotate the filter in the opposite direction. To finish the procedure, one must attach the cover plate (6) again to embed the system and therefore provide a appropriate visual presentation for the equipment.

The construction of the present invention avoids the user from having to move the oven, stove or similar equipment to access the filter, making its use more simple, practical and versatile.

It should be understood that the description provided based on the above figures only refer to one of the possible embodiments for the system of the present invention, and the real scope of the object of the invention is defined in the attached claims.

The invention claimed is:

1. A device for supporting and fixing a water filter in connection with an oven having a chassis comprising:
    a housing for receiving a water filter, wherein the housing attaches to a bottom surface of the chassis of the oven through a top perimeter flap, and wherein the housing has a front wall, and wherein the housing accommodates the water filter and at least one connector to a water pipeline;
    a protective plate that attaches to the front wall of the housing, wherein the housing and the protective plate form a set, wherein the protective plate has a hole that coincides with a hole of the housing to accommodate and guide the positioning of the water filter; and
    a cover plate that hides the protective plate and the water filter to keep the set built-in the oven.

2. The device for supporting and fixing a water filter in connection with an oven having a chassis of claim 1, wherein the housing has the capacity to store a quantity of liquid.

3. The device for supporting and fixing a water filter in connection with an oven having a chassis of claim 1, wherein the hole of the housing is positioned within an anterior surface of the housing.

* * * * *